United States Patent
Yamamoto et al.

(10) Patent No.: US 8,425,163 B2
(45) Date of Patent: Apr. 23, 2013

(54) THREAD FORMING TAP

(75) Inventors: Hironori Yamamoto, Toyokawa (JP); Takayuki Matsushita, Toyokawa (JP)

(73) Assignee: OSG Corporation, Toyokawa (JP)

( * ) Notice: Subject to any disclaimer, the term of this patent is extended or adjusted under 35 U.S.C. 154(b) by 308 days.

(21) Appl. No.: 12/933,834

(22) PCT Filed: Mar. 21, 2008

(86) PCT No.: PCT/JP2008/055335
§ 371 (c)(1), (2), (4) Date: Sep. 21, 2010

(87) PCT Pub. No.: WO2009/116178
PCT Pub. Date: Sep. 24, 2009

(65) Prior Publication Data
US 2011/0020087 A1    Jan. 27, 2011

(51) Int. Cl.
*B23G 5/06* (2006.01)
*B23G 7/02* (2006.01)

(52) U.S. Cl.
USPC ............ 408/222; 408/215; 408/219; 470/199

(58) Field of Classification Search .................. 408/215, 408/216, 219, 222; 470/84, 198, 199, 204
See application file for complete search history.

(56) References Cited

U.S. PATENT DOCUMENTS

| | | | | |
|---|---|---|---|---|
| 5,797,710 A | * | 8/1998 | Sawabe et al. | 408/222 |
| 6,217,267 B1 | * | 4/2001 | Sugano et al. | 408/222 |
| 7,625,292 B2 | * | 12/2009 | Glimpel et al. | 470/199 |
| 8,186,915 B2 | * | 5/2012 | Nakajima et al. | 408/222 |

FOREIGN PATENT DOCUMENTS

| | | |
|---|---|---|
| JP | A-1-289615 | 11/1989 |
| JP | A-2004-174607 | 6/2004 |
| JP | A-2005-205557 | 8/2005 |

OTHER PUBLICATIONS

International Search Report dated May 1, 2008 in International Patent Application No. PCT/JP2008/055335 (with translation).

* cited by examiner

*Primary Examiner* — David B Jones
(74) *Attorney, Agent, or Firm* — Oliff & Berridge, PLC

(57) ABSTRACT

A thread forming tap having a complete thread portion, formed with a predetermined back taper with that decreases rotational torque during tapping work, which reduces load acting on first complete protruding portions, formed at an extreme leading end of the complete thread portion, and thereby suppressing degradation in service life of the tool due to wear.

4 Claims, 6 Drawing Sheets

WORK CONDITIONS
| TAP NAME | M14 × 1.5 |
| --- | --- |
| WORK | SCM440(HRC29~31), t25 |
| DIAMETER OF PREPARED HOLE | φ13.3, 25mm THROUGH HOLE |
| LENGTH OF THE THREAD TO BE FORMED | 20mm |
| WORKING SPEED | 10m/min |
| CUTTING FLUID | NON-AQUEOUS CUTTING OIL (SUPPLIED EXTERNALLY) |
| MACHINE | RADIAL DRILLING MACHINE (SYNCRONOUSLY FEEDING) |
FIG.3(a)
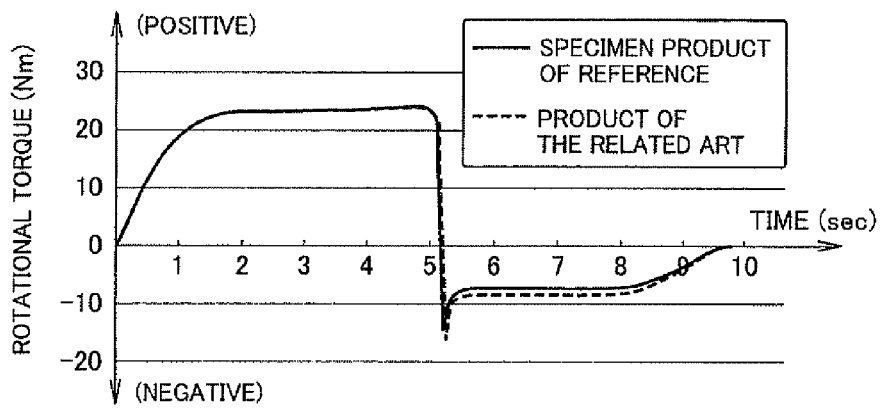
FIG.3(b)
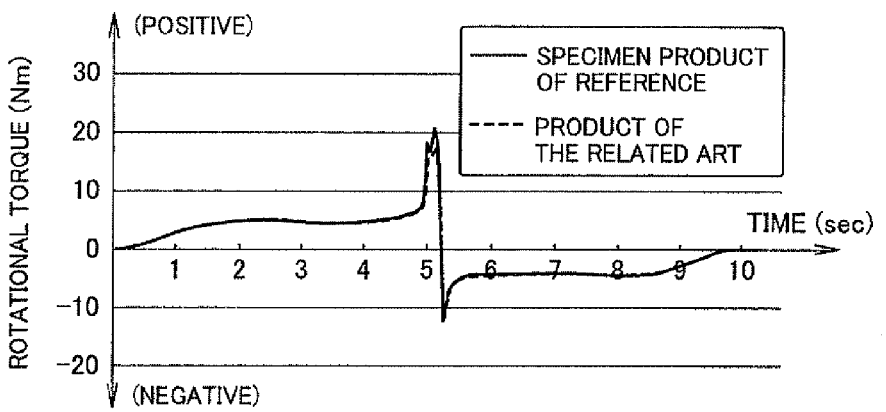
FIG.3(c)

WORK CONDITIONS

| TAP NAME | M14 × 1.5 |
|---|---|
| WORK | SCM440(HRC29～31) |
| PREPARED HOLE | φ13.3, 25mm DEPTH, BLIND HOLE |
| LENGTH OF THE THREAD TO BE FORMED | 20mm |
| WORKING SPEED | 15m/min |
| CUTTING FLUID | NON-AQUEOUS CUTTING OIL (SUPPLIED EXTERNALLY) |
| MACHINE | VERTICAL MACHINING CENTER (SYNCRONOUSLY FEEDING) |

FIG.4(a)

TEST RESULTS

| TESTING SUBJECT | | NUMBER OF TAPPINGS(HOLES) 750    1500 |
|---|---|---|
| PRODUCT OF THE RELATED ART | No1 | 700 |
| | No2 | 600 |
| SPECIMEN PRODUCT OF REFERENCE | No1 | 1200 |
| | No2 | 1000 |

FIG.4(b)

THREAD FORMING TAP

TECHNICAL FIELD

The present invention relates to a thread forming tap and, more particularly, to a technology of suppressing wear of a protruding portion located at an extreme front end of a complete thread portion for improvement of service life of a tool.

BACKGROUND ART

There has been known a thread forming tap (cold forming tap) including a complete thread portion and a chamfered thread portion successive to the complete thread portion and having a radial size decreasing toward a leading end of the chamfered thread portion. An external thread alternately formed with protruding portions and radial relief portions is provided with the complete thread portion and the chamfered thread portion. Screwing the tap into a prepared hole of a workpiece at the chamfered thread portion allows the protruding portions to cut into a surface layer portion of an internal wall of the prepared hole. Then resultant plastic deformation at the surface layer portion of the internal wall of the prepared hole such that the internal thread is formed. Tools, disclosed in Patent Publications 1 and 2, represent such examples which are simplified in cleaning work owing to no disposal of chips.
Patent Publication 1: Japanese Patent Application Publication No. 1-289615
Patent Publication 2: Japanese Patent Application Publication No. 2005-205557

DISCLOSURE OF THE INVENTION

Issues to be Addressed by the Invention

Meanwhile, such a thread forming tap encounters large rotational torque (resistance) during tapping work. To reduce such torque, the complete thread portion may be provided with a predetermined back taper. However, this causes the largest diameter part of the complete thread portion, i.e., the protruding portions located at the extreme leading end (first complete protruding portions), to bear large load and then, the protruding portion is accelerated to be wared. Consequently, a difficulty in obtaining adequate service life of the tool depending on work conditions is caused. In case of the thread forming tap, particularly, the tool encounters inversed load due to springback of the internal thread when the tool is reversely rotated to be drawn off therefrom after tapping work has been completed. Then, wearing is further accelerated due to fatigue or the like.

Further, Patent Publication 2 proposes the provision of the complete thread portion formed with, for instance, a large diameter thread portion as shown in FIG. 6. In this case, the large diameter thread portion has a number of threads (protruding portions) with which forming pressures are applied repeatedly to form the internal thread, then a load is dispersed. However, the large diameter thread portion substantially still functions as the complete thread portion, then, forming the internal thread is still executed in the absence the back taper. Therefore, a rotational torque during tapping work unfavorably increases. In FIG. 6, dimension on a longitudinal axis is enlarged with respect to that on the horizontal axis for the purpose of clarifying a variation in radial size. However, FIG. 6 shows merely an illustration, that is, FIG. 6 is not drawn with accurate dimensional fraction. And FIG. 6 shows a varying pattern of a radial size, and it is different in shape from an actual tap.

SUMMARY OF THE INVENTION

The present invention has been completed with the above view in mind and has an object to provide a thread forming tap having a complete thread portion, formed with a predetermined back taper with a view to decreasing rotational torque during tapping work, which reduces load acting on first complete protruding portions, formed at an extreme leading end of the complete thread portion, and thereby suppressing degradation in service life of the tool due to wears or the like.

Means for Addressing the Issues

To achieve the object, the first aspect of the present invention features that an external thread having a complete thread portion and a chamfered thread portion successive to the complete thread portion and decreasing in diameter toward a leading end of the tap, the complete thread portion and the chamfered thread portion having protruding portions and radial relief portions that are alternately formed, wherein: (a) the complete thread portion includes a front thread portion, successive to the chamfered thread portion, and a remaining rear thread portion, the front thread portion having an axial length five times or less a pitch P of a thread; (b) the front thread portion has a fixed radial size, equal to that of a rear end of the chamfered thread portion with an axial gradient of change being zero, or a back taper with a radial size gradually decreasing from the rear end of the chamfered thread portion toward the rear thread portion with a predetermined gradient of change; and (c) the rear thread portion includes a back taper with a radial size gradually decreasing from a rear end of the front thread portion toward a shank with a greater gradient of change than that of the front thread portion; and (d) one of an outer diameter and an effective diameter of the external thread is determined for the front thread portion and the rear thread portion respectively in radial size and the other of the outer diameter and the effective diameter of the external thread has the back taper provided on the complete thread portion over an entire area thereof with the same gradient of change as that of the rear thread portion.

With the thread forming tap of the first aspect of the invention, a sixth aspect of the invention features that (a) the front thread portion has the gradient of change being zeroed or the back taper with the radial size gradually decreasing with a fixed gradient of change of 3 μm or less per for the pitch 1P (pitch) of the thread; and (b) the rear thread portion has the back taper with the radial size gradually decreasing with a fixed gradient of change ranging from 3 to 7 μm for 1P (pitch) of the thread.

With the thread forming tap of the first or sixth aspect of the invention, a seventh aspect of the invention features that the front thread portion has the back taper with the radial size gradually decreasing with a smaller gradient of change than that of the rear thread portion.

Effects of the Invention

With such a thread forming tap, the complete thread portion is divided into the front thread portion, having the thread pitches 5P (pitch) or less for the pitch P of the thread, and the remaining rear thread portion. The front thread portion is provided with the back taper in which the radial size gradually decreases with the gradient of change being zeroed or predetermined the gradient of change. In contrast, the rear thread portion is provided with the back taper in which the radial size gradually decreases with a greater gradient of change than that of the front thread portion. When, for instance, wear at the extreme front end of the protruding portions 20 occurs as tapping work is executed, subsequent protruding portions are involved in processing instead of a worn area. Therefore, a load is dispersed into the plural protruding portions of the front thread portion during tapping work. Then, this suppresses acceleration of wears at the protruding portions of the front thread portion and improves a service life of the tool. Raw material for the internal thread (workpiece) to be formed by tapping work with the thread forming tap generally has a predetermined elasticity and is likely to decrease in diameter due to springback. Thus, even if the radial size of the front thread portion gradually decreases, internal thread forming work can be performed, provided that the gradient of change in radial size is small, and relevant load can be dispersed.

Further, after the chamfered thread portion and the protruding portions of the front thread portion, present at the extreme front end thereof, form the internal thread in a nearly complete shape, a forming pressure is further applied to the internal thread by the protruding portions existing on the front thread portion. This increases a degree of completion of the internal thread, therefore, springback is reduced. When the tool is rotated reversely for withdrawal, thus, a load acting on the front thread portion in a reverse direction is reduced and wear due to fatigue or the like owing to a frictional force is suppressed. Thereby, a service life of the tool is improved in this respect. The degree of completion of the internal thread is of plastic deformation to a subject size, due to apply forming pressures repeatly Meanwhile, since the front thread portion has the axial length that is relatively as short as 5P (five thread pitches) or less for pitches (P) of the thread, an increase in rotational torque during tapping work is suppressed. This suppresses an increase in rotational torque during tapping work as a whole and an acceleration of wear at the protruding portions 20 by dispersing a load and improving the degree of completion of the internal thread as compared to the tool disclosed in Patent Publication 2. Thereby, a service life of the tool is improved as compared to the tool disclosed in Patent Publication 2.

In addition, the thread portion is divided into the front thread portion and the rear thread portion in either one of the outer diameter or the effective diameter of the external thread and the front thread portion has the radial size with the lessened gradient of change (to include "0"). Since the other one of the outer diameter and the effective diameter of the external thread is provided with the back taper with the same gradient of change as that of the rear thread portion over a whole area of the complete thread portion, the load is dispersed with the plural protruding portions of the front thread portion, and thereby acceleration of wear is suppressed. In addition, since the thread portion is provided with the back taper in either the outer diameter or the effective diameter of the external thread with a relatively large gradient of change over an entire area of the complete thread portion. This further suppresses an increase in rotational torque during tapping work regardless of the presence of the front thread portion.

According to the sixth aspect of the invention, the front thread portion is provided with a gradient of change being zero or the back taper in which radial size is gradually decreased with the fixed gradient of change of 3 μm or less for 1P (pitch) of the thread. Thus, a load is dispersed and acceleration of wear is suppressed due to improvement of degree of completion of the internal thread. In addition, since the rear thread portion is provided with the back taper in which the radial size gradually decreases with the fixed gradient of change ranging from 3 to 7 μm for 1P (pitch) of the thread, rotational torque during tapping work is reduced.

According to the seventh aspect of the invention, a case in which the front thread portion is provided with the back taper in which the radial size gradually decreases with a smaller gradient of change than that of the rear thread portion. Therefore, the increase in rotational torque during tapping work is suppressed and development of wears is suppressed due to dispersing the load and improvement in degree of completion of the internal thread as compared to a case in which the front thread portion has a fixed radial size where a gradient of change is zero.

BRIEF DESCRIPTION OF DRAWINGS

FIG. 1(a) is a front view, FIG. 1(b) is an enlarged view in cross section taken on line IB-IB of FIG. 1(a) and FIG. 1(c) is a view showing a varying pattern in radial size of a thread in an axial direction.

FIG. 2(a) is for reference product, and FIGS. 2(b) and (c) are for embodiments of the present invention.

FIGS. 3(a) to (c) are views showing work conditions and results on rotational torques when the rotational torques are measured by performing tapping works with the use of the reference product and the related art product.

FIGS. 4(a) and (b) are views showing work conditions and numbers of tapped holes before the end of service life when durabilities are measured by performing tapping works with the use of the reference product and the related art product, and the number of tapped holes before the end of service life.

Figure 1A:
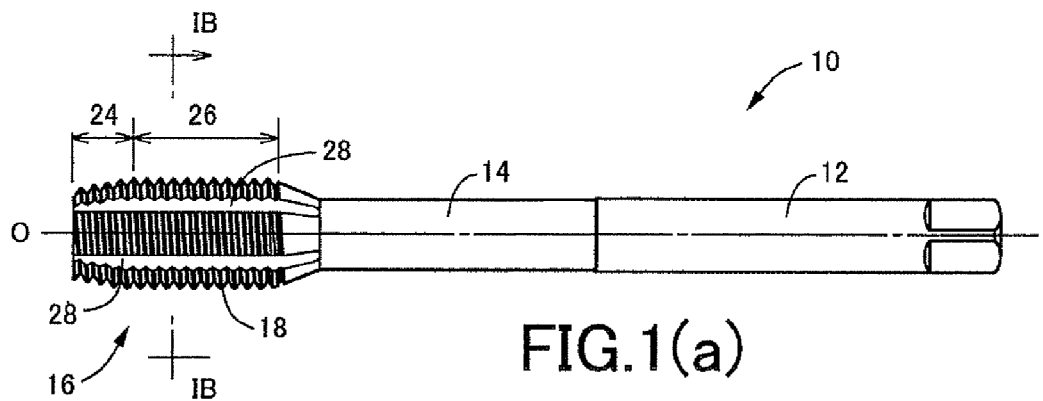
FIGS. 1(a) to (c) are views showing a thread forming tap of one embodiment according to the present invention.

10: Thread forming tap 16: Thread portion (External thread) 20: Protruding portions 22: Relief portions 24: Chamfered thread portion 26: Complete thread portion 26a: Front thread portion 26b: Rear thread portion

BEST MODE FOR CARRYING OUT THE INVENTION

A thread forming tap of the present invention is used for forming an internal thread by being screwed into a prepared hole formed in a workpiece forcedly from a chamfered thread portion side and cutting into a surface layer portion of an inner wall of the prepared hole such that plastic deformation occurs. The thread forming tap may have a leading end integrally provided with a drill or a reamer, etc., for forming the prepared hole or an inner diameter finishing cutter for finishing an inner diameter of the internal thread.

The thread forming tap may preferably have a plurality of protruding portions in three rows or more to be contiguous in parallel to an axis at equidistant intervals about the axis. However, the thread forming tap may be implemented in various forms wherein the protruding portions of each row are contiguous in spiral form twisted about the axis or wherein the protruding portions of each row are located at unequallyspaced intervals about the axis. Oil grooves or the like may be axially provided such that an external thread is split for supplying cutting fluid.

Further, the present invention may be applied not only to a thread forming tap for forming a single-start thread but also to a thread forming tap for a multi-start thread of two or more start threads. Even applied to the multi-start thread, the axial length of the front thread portion may suffice to be five times the length of or less than the pitch (P) of the thread.

Since no chip is disposed by the thread forming tap, tapping work for forming an internal thread can be favorably conducted on both of a blind hole and a through hole.

If the axial length of the front thread portion becomes longer than five times thread pitches 5P (pitches), then, rotational torque during tapping work increases and, hence, the axial length needs to be 5P or smaller. With the related art, further, only one protruding portion, located at an extreme front end of a complete thread portion, is designed to have a regular dimension in conformity to the internal thread to be tapped and is provided with the relatively large back taper with the radial size gradually decreasing just behind the one protruding portion. With the present invention, in contrast, the axial length of the front thread portion may suffice to be determined so as to exceed one protruding portion and preferably include two or more protruding portions. To define the axial length in terms of the thread pitch P, the axial length may preferably have 1P (pitch) or more, more suitably, to have 2P (pitches) or more for the purpose of causing, for instance, load to be dispersed, with improving a degree of completion of the internal thread and therefore suppressing development of wear. With a thread forming tap having three cutter blades with which three rows of protruding portions are formed about the axis, two or more protruding portions may be included when the axial length of the front thread portion is one-third (⅓) P (pitch) or more.

In order that a load is reliably dispersed during tapping work to form the internal thread and the degree of completion of the internal thread is improved, the front thread portion may preferably have a fixed radial size whose gradient of change in the axial direction is set to be zero. For the purpose of suppressing an increase in rotational torque during tapping work, however, the front thread portion may be preferably provided with a back taper whose gradient of change is smaller than that of the rear thread portion. If the back taper has the radial size whose gradient of change is greater than 3 μm for 1P (pitch), then, there is a less difference between the back taper of this invention and a back taper of the related art or a back taper of the rear thread portion. This results in a difficulty caused in adequately obtaining actions to disperse load and improve the degree of completion of the internal thread. Thus, the back taper may preferably have the radial size gradually decreasing with the gradient of change of 3 μm or less for 1P (pitch).

In view of reducing rotational torque during tapping work, the rear thread portion may preferably have a radial size gradually decreasing with the gradient of change ranging from 3 to 7 μm for 1P (pitch). However, it doesn't matter if the gradient of change may deviate from such a range depending on work conditions of the internal thread. In addition, no need arises that the protruding portions in an entire area of the rear thread portion are brought into contact with the internal thread and apply forming pressures. Only a part of the protruding portion, placed in a position near the front thread portion, may suffice to be brought into contact with the internal thread.

The front thread portion and the rear thread portion are provided with the back tapers with the radial sizes linearly and gradually decreasing in the axial direction with fixed gradients of change, for instance. The gradients of change (rates of change) in the radial size may be continuously and smoothly varied or the radial size may be varied on a polygonal line. Such modifications may be implemented in various modes. In such cases, a region, in which the gradient of change in the radial size in the back taper is, for instance, 3 μm or less for 1P (pitch) may be regarded to be the front thread portion and another region, in which the gradient of change in the back taper exceeds 3 μm for 1P (pitch), may be regarded to be the rear thread portion Embodiment Now, various embodiments of the present invention will be described below in detail with reference to the accompanying drawings.

Figure 1B:
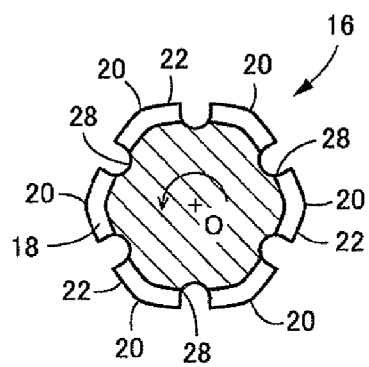
Figure 1C:
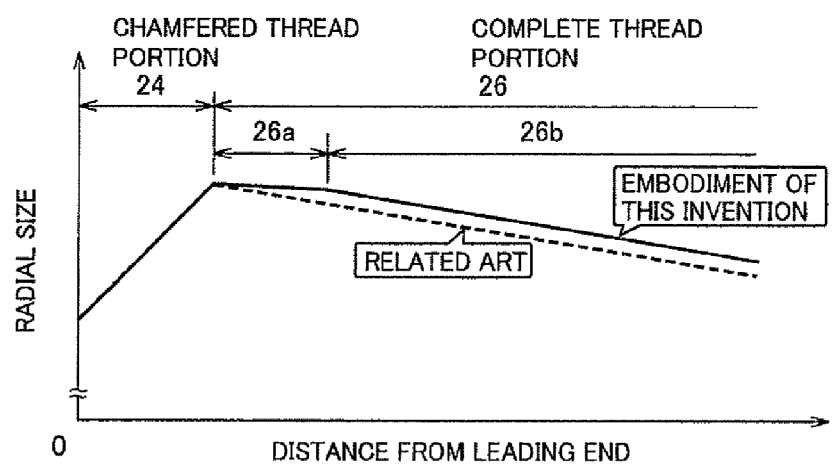

FIGS. 1(a) to (c) are views showing a thread forming tap 10 of one embodiment according to the present invention. FIG. 1(a) represents a front view as viewed in a direction perpendicular to an axis "0". FIG. 1(b) represents an enlarged view on cross section taken on line IB-IB of FIG. 1(a). FIG. 1(c) represents a view showing a varying pattern of a radial size of a thread portion 16 along an axial direction. The thread forming tap 10 includes a shank 12 adapted to be mounted on a spindle by a chucking device not shown in the figure, a neck portion 14 slightly smaller in diameter than the shank 12, and the thread portion 16 for thread forming (rolling) an internal thread, all of which are integrally formed in such an order to be axially contiguous in a concentric relation. The thread portion 16 has a cross section in a polygonal shape whose sides are outwardly curved and in the illustrated embodiment, the cross section of the thread portion 16 has a nearly regular hexagonal shape. The thread portion 16 has an outer circumferential periphery formed with an external thread available to cut into a surface layer portion of a prepared hole of a workpiece (raw material to be formed with an internal thread) and to cause plastic deformation such that the internal thread is cold-formed. The thread forming tap 10 of the present embodiment is designed for processing a single-start thread, therefore, the thread forming tap 10 has the external thread formed in a single-start thread.

A thread portion 18 of the external thread has a cross-sectional shape formed in conformity to a root shape of the internal thread to be formed and is formed along a helix having a lead angle corresponding to that of the internal thread. The thread 18 includes six protruding portions 20, protruding radially outward, and radial relief portions 22 having a smaller diameter than the protruding portions 20, successive to the protruding portions 20, respectively, which are alternately located around the axis "O" in an advancing direction of the thread at equiangular intervals of 60°. That is, apex portions of the regular hexagon correspond to the protruding portions 20 respectively, and the multiple protruding portions 20 are formed in sequence in parallel to the axis "O" such that six rows of the multiple protruding portions 20, successive in an axial direction as described above, are formed around the axis "O" at the equiangular intervals. Also, FIG. 1(b) is a cross-sectional view of a root portion of the thread portion 18 that is cut along the helix.

The thread portion 16 further includes a complete thread portion 26 whose radial size is nearly fixed in the axial direction, and a chamfered thread portion 24 whose diameter is decreasing toward a leading end thereof. The chamfered thread portion 24 has a radial size varying such that an outer diameter, an effective diameter and a root diameter of the external thread decrease in diameter respectively with fixed gradients of change equal to each other. Even the chamfered thread portion 24 has a nearly regular hexagon shape like the shape shown in FIG. 1(b) and the chamfered thread portion 24 has the protruding portions 20 and the radial relief portions 22 alternately formed in a circumferential direction. Although the thread portion 16, inclusive of the chamfered thread portion 24, has an axial radial size with a varying pattern as shown in FIG. 1(c) being related to the radial size of each protruding portion 20 involved in forming the internal thread, the radial relief portions 22 have radial sizes that vary on the same varying patterns as those of the protruding portions 20. In addition, on an outer circumferential wall of the thread portion 16, oil grooves 28 for supply of lubricating oil are formed in parallel to the axis "O" at intermediate positions of two adjacent protruding portions 20 among the six rows of the protruding portions 20 about the axis "O".

In operation, screwing the thread forming tap 10 into a prepared hole formed in a workpiece at the chamfered thread portion 24 allows the protruding portions 20 to cut into an inner-wall surface layer of the prepared hole, then an internal thread is formed dut to plastic deformation. In performing tapping work with the use of such a thread forming tap 10, a large rotational torque is required and, hence, the thread forming tap 10 is likely to have breakages or the like. To prevent this, the related art took a measure to have the complete thread portion 26 provided with a predetermined back taper as indicated by a broken line in FIG. 1(c). With such a measure, however, the largest diameter part of the complete thread portion 26, i.e., the protruding portions 20 located at the extreme front end (first complete protruding portions), bears significant load and wear is accelerated. This results in an issue of a difficulty in obtaining adequate service life of the tool depending on working conditions. Especially for the thread forming tap, even when the tool is rotated in a reverse direction after tapping work is completed to be drawn out of the internal thread, a load in the reverse direction is applied to the tool due to springback of the internal thread, therefore, wear of the tool is further accelerated owing to fatigue or the like.

In the illustrated embodiment, on the contrary, the complete thread portion 26 is further divided into a front thread portion 26a and a rear thread portion 26b as indicated by a solid line in FIG. 1(c). The front thread portion 26a corresponds to a frontal area successive to the chamfered thread portion 24 and has an axial length ranging from 1P (pitch) to 5P (pitches) with respect to a thread pitch P of the thread portion 16. In the illustrated embodiment, the axial length is determined to have about 2P (pitches) such that two protruding portions 20 successive to each other in the axial direction among each of the six rows of protruding portions 20 is included in the front thread portion. And a remaining portion of the complete thread portion 26 is regarded to be the rear thread portion 26b. In addition, the front thread portion 26a is provided with a back taper whose gradient of change of a radial size from a rear end of the chamfered thread portion 24 toward the rear thread portion 26b is relatively small. More particularly, the radial size gradually decreases with a fixed gradient of change of 3 μm or less for 1P (pitch) (in the illustrated embodiment, about 2 μm for 1P). The rear thread portion 26b has a back taper in its entire area whose gradient of change of a radial size from a rear end of the front thread portion 26a toward the neck portion 14 is larger than that of the front thread portion 26a. More particularly, the radial size gradually decreases with a fixed gradient of change ranging from 3 to 7 μm for 1P (pitch).

Figure 2A:
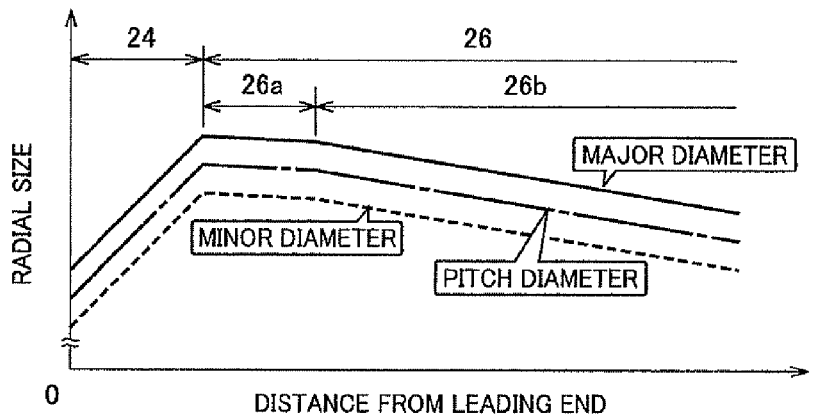
FIGS. 2(a) to (c) are views illustrating axial varying patterns in an axial direction of an major diameter, an pitch diameter and a minor diameter of the thread shown in FIG. 1.
Figure 2B:
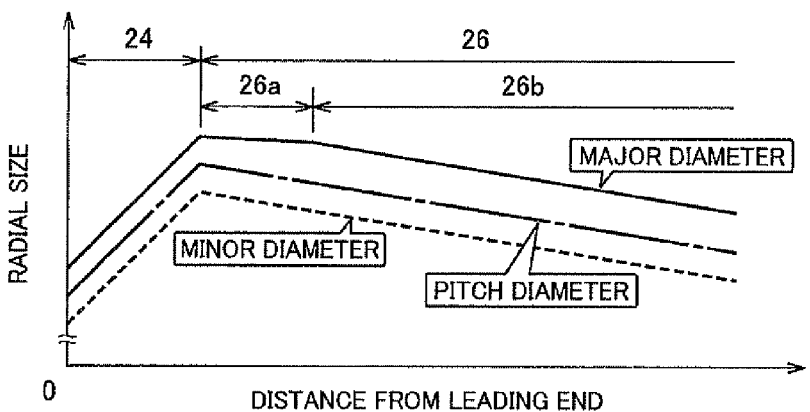
Figure 2C:
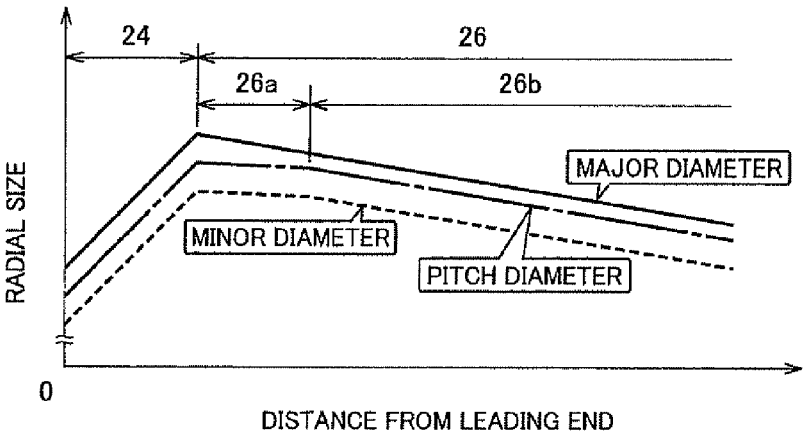
Figure 5A:
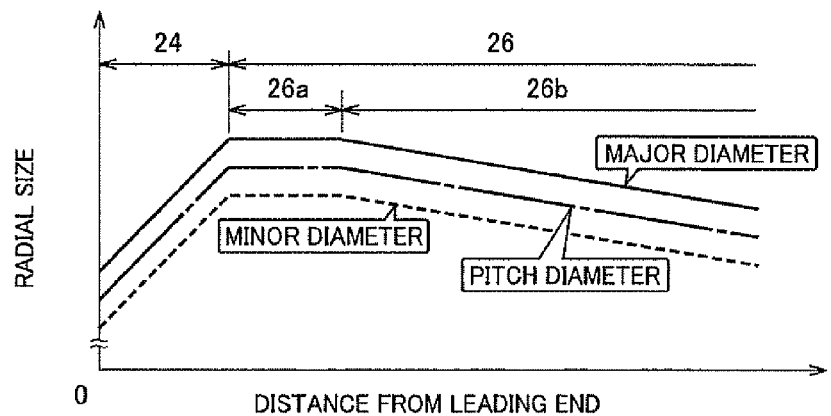
FIGS. 5(a) to (c) are views illustrating embodiments with a front thread portion of a complete thread portion having a fixed radial size and are corresponding to FIGS. 2(a) to (c).
Figure 5B:
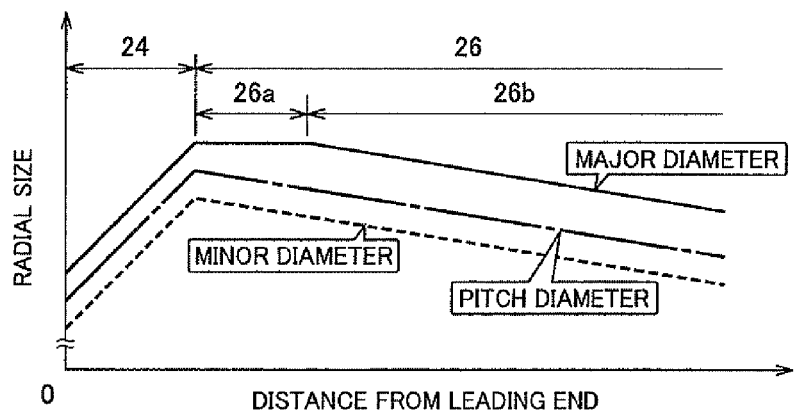
Figure 5C:
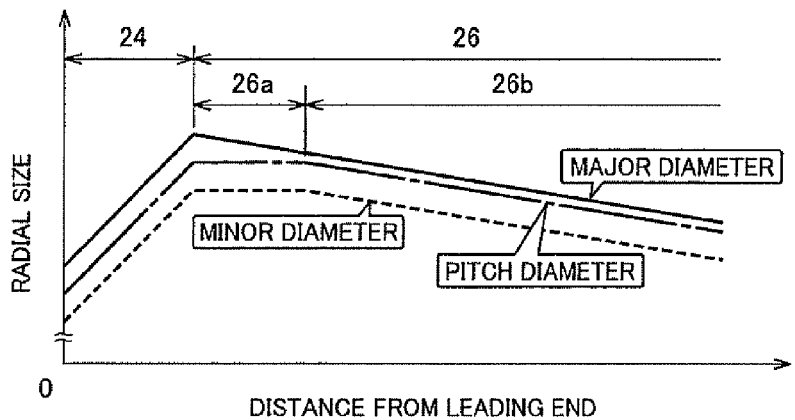
Figure 6:
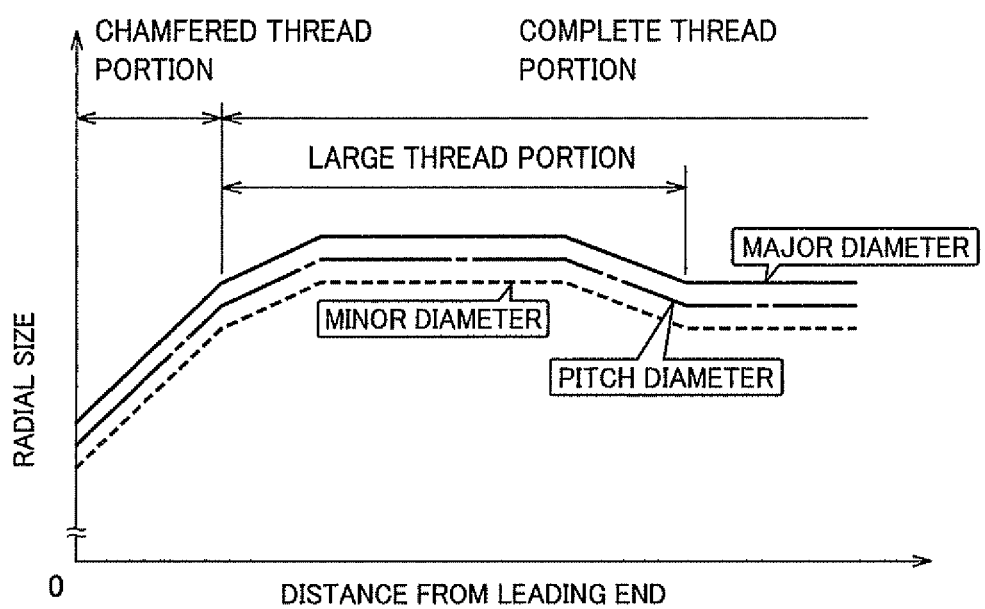
FIG. 6 is a view illustrating the related art technology, having a complete thread portion formed with a large diameter thread portion, and showing varying patterns of an major diameter, a pitch diameter and a minor diameter in an axial direction.

According to the axial varying pattern for the complete thread portion 26, all of an outer diameter, an effective diameter and a root diameter of the thread portion 18 of the external thread are determined for each of the front thread portion 26a and the rear thread portion 26b respectively, as shown, for instance, in FIG. 2(a). Then, the radial sizes vary with a common varying pattern, that is, the gradients of change or the like of the radial sizes are equal to each other. In other alternatives, only the outer diameter may be determined for each of the front thread portion 26a and the rear thread portion 26b respectively as shown in FIG. 2(b). Further, only the effective diameter and the root diameter may be determined for each of the front thread portion 26a and the rear thread portion 26b respectively as shown in FIG. 2(c). In such cases, other radial sizes, i.e., the effective diameter and the root diameter in FIG. 2(b) and the outer diameter shown in FIG. 2(c) may suffice to have the back tapers with the radial sizes gradually decreasing with a fixed gradient of change over an entire area of the complete thread portion 26 like the related art. With a structure shown in FIG. 2(b), the effective diameter and the root diameter are provided with back tapers whose gradients of changes are same as that of, for instance, the radial size of the outer diameter of the rear thread portion 26b respectively. With the structure shown in FIG. 2(c), the outer diameter is provided with a back taper whose gradient of change is same as that of, for instance, the effective diameter of the rear thread portion 26b. Even with any of the structures shown in FIGS. 2(a) to (c), a front end portion of the complete thread portion 26, i.e., a boundary portion with the chamfered thread portion 24, has the outer diameter, the effective diameter and the root diameter all of which are defined in regular dimensions in conformity to those of the internal thread to be formed. FIG. 2(a) corresponds to the reference product, while FIGS. 2(b) and (c) correspond to the invention's product. In addition, FIG. 1(c) shows the varying pattern of the outer diameter in case of FIG. 2(b). Further, in all of FIG. 1(c) and FIGS. 2(a) to (c), the dimension on the longitudinal axis is shown in an enlarged scale relative to that of the horizontal axis with a view to clarifying variations in radial size. These are represented only as illustrative purposes with no intension to be shown in accurate dimensional ratios and represent the varying patterns on the diametric dimensions to be different from an actual tap configuration. This similarly applies to FIGS. 5(a) to (c) showing other embodiments.

Further, the thread forming tap 10 of the present embodiment is made of cemented carbide, in addition, the thread portion 16 has a surface applied with predetermined hard anodic oxide coating (with TiCN in the illustrated embodiment).

With such a thread forming tap 10, the complete thread portion 26 is divided into the front thread portion 26a, having the thread pitches 5P (pitches) or less for the pitch P of the thread, and the remaining rear thread portion 26b. The front thread portion 26a is provided with the back taper in which the radial size gradually decreases with a relatively small gradient of change. In contrast, the rear thread portion 26b is provided with the back taper in which the radial size gradually decreases with a greater gradient of change than that of the front thread portion 26a. When, for instance, wear at the extreme front end of the protruding portions 20 occurs as tapping work is executed, subsequent protruding portions 20 are involved in processing instead of a worn area. Therefore, load is dispersed into the plural protruding portions 20 of the front thread portion 26a during tapping work. Then, this suppresses acceleration of wears at the protruding portions 20 of the front thread portion 26a and improves a service life of the tool Raw material for the internal thread (workpiece) to be formed by tapping work with the thread forming tap 10 generally has a predetermined elasticity and is likely to decrease in diameter due to springback. Thus, even if the radial size of the front thread portion 26a gradually decreases, internal thread forming work can be performed, provided that the gradient of change in radial size is small, and relevant load can be dispersed.

Further, after the chamfered thread portion 24 and the protruding portions 20 of the front thread portion 26a, present at the extreme front end thereof, form the internal thread in a nearly complete shape, a forming pressure is further applied to the internal thread by the protruding portions 20 existing on the front thread portion 26a. This increases a degree of completion of the internal thread, therefore, springback is reduced. When the tool is rotated reversely for withdrawal, thus, a load acting on the front thread portion 26a in the reverse direction is reduced and wear due to fatigue or the like owing to a frictional force is suppressed. Thereby a service life of the tool is improved in this respect.

Meanwhile, since the front thread portion 26a has the axial length that is relatively as short as 5P (pitches) or less, an increase in rotational torque during tapping work is suppressed. This suppresses an increase in rotational torque during tapping work as a whole and an acceleration of wear at the protruding portions 20 by dispersing a load and improving the degree of completion of the internal thread as compared to the tool disclosed in Patent Publication 2. Thereby, a service life of the tool is improved as compared to the tool disclosed in Patent Publication 2.

With the structure of FIG. 2(a), further, all of the outer diameter, the effective diameter and the root diameter of the external thread are determined for (constructed dividedly into) the front thread portion 26a and the rear thread portion 26b respectively. Since the front thread portion 26a is provided with the outer diameter, the effective diameter and the root diameter whose gradients of changes are small, loads on a whole of the protruding portions 20 for forming roots and flanks of the internal thread are dispersed and degree of completion of the internal thread is improved. Therefore, development of wears at the protruding portions 20 is suppressed.

With the thread forming tap 10, furthermore, when outer diameter portions of the plural protruding portions 20, i.e., apices and their vicinities of the thread portion 18, cut into the raw material (workpiece) to be formed into the internal thread by plastic deformation, the thread forming tap 10 encounters the largest forming resistance and is easily worn out. Like the structures shown in FIGS. 2(a) and (b), since the thread portion 26 is divided into the front thread portion 26a and the rear thread portion 26b in at least the outer diameter of the external thread and the front thread portion 26a has a lessened gradient of change of the radial size, loads acting on the outer diameter portions of the plural protruding portions 20 (apex and its vicinity of the external thread) in the front thread portion 26a, is dispersed and a degree of completion of the internal thread is improved. Therefore, acceleration (development) of wears at the outer diameter portions are effectively suppressed.

With the structures shown in FIGS. 2(b) and (c), the thread portion 26 is divided into the front thread portion 26a and the rear thread portion 26b in either one of the outer diameter or the effective diameter of the external thread and the front thread portion 26a has the radial size with the lessened gradient of change. Since the other one of the outer diameter and the effective diameter of the thread 18 is provided with the back taper with the same gradient of change as that of the rear thread portion 26b over a whole area of the complete thread portion 26, the load is dispersed with the plural protruding portions 20 of the front thread portion 26a and thereby acceleration of wear is suppressed. In addition, since the thread portion 26 is provided with the back taper in either the outer diameter or the effective diameter of the external thread with a relatively large gradient of change over an entire area of the complete thread portion 26, an increase in rotational torque during tapping work This is further suppressed regardless of the presence of the front thread portion 26a.

With the present embodiment, moreover, since the front thread portion 26a has the axial length of 1P (pitch) or more, the front thread portion 26a includes six protruding portions 20 or more. Thus, load is dispersed onto the plural protruding portions 20 present on the front thread portion 26a and degree of completion of the internal thread is improved. Then, development of wears of the protruding portions 20 is suppressed.

With the present embodiment, besides, the front thread portion 26a is provided with the back taper in which radial size is gradually decreased with the fixed gradient of change of 3 μm or less for 1P (pitch). Thus, the load is dispersed and acceleration of wear is suppressed due to improvement of degree of completion of the internal thread. In addition, since the rear thread portion 26b is provided with the back taper in which the radial size gradually decreases with the fixed gradient of change ranging from 3 to 7 μm for 1P (pitch), rotational torque during tapping work is reduced.

With the present embodiment, further, the front thread portion 26a is provided with the back taper in which the radial size gradually decreases with a smaller gradient of change than that of the rear thread portion 26b. Therefore, the increase in rotational torque during tapping work is suppressed, and development of wears is suppressed due to dispersing the load and improvement in degree of completion of the internal thread as compared to a case in which the front thread portion 26a has a fixed radial size where a gradient of change is zero.

In this connection, the thread forming tap 10 (reference product) shown in FIG. 2(a), and the related art product with the complete thread portion 26 having the back taper with the same gradient of change as that of the rear thread portion 26b over an entire area of the complete thread portion 26 as shown by a broken line in FIG. 1(c) are prepared. Then, tapping works were conducted under a processing condition indicated in FIG. 3(a) to measure rotational torques, and results shown in FIGS. 3(b) and (c) were obtained. With the tapping condition shown in FIG. 3(a), "SCM440" of an item "WORKPIECE" represents a steel product symbol of chromium molybdenum steel defined under "HS Standard" and "HRC" represents Rockwell C hardness. FIG. 3(b) represents rotational torque occurring during tapping work performed on a prepared hole at a first time and FIG. 3(c) represents rotational torque during tapping work on the internal thread formed by tapping work at the first time at a second time with a view to increasing tapping precision.

According to a result of FIG. 3(b), it turned out that the rotational torque during tapping work (torque on a positive side) of reference product was at a level nearly equal to that of the related art product and that almost no increase was found in rotational torque regardless of the presence of the front thread portion 26a having the radial size with the lessened gradient of change. Meanwhile, rotational torque was decreased by several amount (Nm) as compared to that of the related art product during operation to draw the tap out of the internal thread by reversely rotating the same. That is, it turned out that the degree of completion of the internal thread is increased and springback is reduced because forming pressures are applied to the internal thread repeatedly during tapping work with the front thread portion 26a. Thus, it also turned out that the load on the front thread portion 26*a* decreased when the tool is reversely rotated for withdrawal.

It is found that almost no difference exists between the reference product and the related art product in rotational torque shown in FIG. 3(*c*), i.e., in rotational torque during tapping work at the second time. It is considered that rotational torque of approximately 5 Nm is required for tapping work at the second time owing to a contact between the complete thread portion 26 and the internal thread. Accordingly, rotational torque of approximately 25 Nm required for tapping work at the first time as shown in FIG. 3(*b*), it is estimated that about 5 Nm (20%) was owing to the complete thread portion 26, and the remaining about 20 Nm was owing to the chamfered thread portion 24.

FIGS. 4(*a*) and (*b*) are views illustrating results of tests with the thread forming tap 10 (reference product) of the present embodiment shown in FIG. 2(*a*) and the related art product which has the complete thread portion 26 provided with the back taper with the same gradient of change as that of the rear thread portion 26*b* over an entire area of the complete thread portion 26 as indicated by the broken line in FIG. 1(*c*). The invention's products and the related art products were prepared by two pieces, respectively. The tests were conducted to check the number of tapped holes (the number of tapping involved) until service life was reached when tapping work was performed under the condition shown in FIG. 4(*a*). Whether service life remained or not was determined based on whether a screw plug gauge (GP) can passthrough the tapped internal thread or not. That is, it was determined that service life of the tool was reached when the thread portion 16 was worn out and the internal thread was fowled to be small in dimension, then the screw plug gauge (GP) could not pass.

As will be apparent from results of the test shown in FIG. 4(*b*), the related art products could perform tapping work only for 600 to 700 pieces of the internal threads but the reference products were able to perform tapping work for 1000 to 1200 pieces of the internal threads. That is, the service life of the invention's product increases to be about 1.4 to 2 times than the related art product.

While with the present embodiments mentioned above, the front thread portion 26*a* of the complete thread portion 26 is provided with the predetermined back taper, the front thread portion 26*a* may take a fixed radial size with an axial gradient of change being zeroed as shown in FIG. 5. In such a case, the load occurring during tapping to form the internal thread can be dispersed reliably onto the plural protruding portions 20 of the front thread portion 26*a*. In addition, high tapping pressure is repeatedly applied to the internal thread. Therefore, the springback is reduced due to increase of the degree of completion of the internal thread. The load acting on the front thread portion 26*a* can be decreased when the tool is reversely rotated for withdrawal, and the acceleration of wears of the protruding portions 20 is suppressed, then, the service life of the tool is increased.

FIGS. 5(*a*) to (*c*) correspond to FIGS. 2(*a*) to (*c*), respectively. FIG. 5(*a*) represents a case wherein both the outer diameter and the effective diameter of the thread 18 on the external thread are determined for the front thread portion 26*a* and the rear thread portion 26*b* respectively, and the outer diameter and the effective diameter vary on the same varying pattern. FIG. 5(*b*) represents a case wherein only the outer diameter is determined for the front thread portion 26*a* and the rear thread portion 26*b* respectively, and the effective diameter and the root diameter are provided with the back taper respectively, having the radial size gradually decreasing over the entire area of the complete thread portion 26 with a fixed gradient of change (with the same gradient of change as that of the outer diameter of the rear thread portion 26*b*). FIG. 5(*c*) represents a case in which only the effective diameter and the root diameter are determined for the front thread portion 26*a* and the rear thread portion 26*b* respectively, and the outer diameter is provided with the back taper having the radial size gradually decreasing over the entire area of the complete thread portion 26 that has the fixed gradient of change (with the same gradient of change as those of the effective diameter and the root diameter of the rear thread portion 26*b*).

In the foregoing, the various embodiments of the present invention have been described above with reference to the drawings. However, it is intended that the embodiments described be considered only as illustrative of the present invention and that the present invention may be implemented in various modifications and improvements based on knowledge of those skilled in the art.

INDUSTRIAL APPLICABILITY

In the thread forming tap of the present invention, the complete thread portion is divided into the front thread portion, having 5P (pitches) or less for the pitch P of the thread, and the remaining rear thread portion. The front thread portion is constructed such that a radial size is fixed with the gradient of change which is zero, or the front thread portion is provided with the back taper where a radial size is gradually decreased with the gradient of change which is a relatively small value. In contrast, the rear thread portion is provided with the back taper with a greater gradient of change than that of the front thread portion. Therefore, load during tapping work is dispersed onto the plural protruding portions of the front thread portion, and a springback is reduced since a degree of completion of the internal thread is increased. Further, when the tool is reversely rotated for withdrawal, a load acting on the protruding portions in the reverse direction is reduced, then, a wear at the protruding portions is suppressed and thereby a good service life of the tool is obtained. It is suitably used as a tool with capability of forming an internal thread with no chip disposal.

The invention claimed is:

1. A thread forming tap comprising:
an external thread including:
   a complete thread portion having protruding portions and radial relief portions that are alternately formed; and
   a chamfered thread portion successive to the complete thread portion and decreasing in diameter toward a leading end of the tap, the chamfered thread portion having protruding portions and radial relief portions that are alternately formed, wherein
the complete thread portion includes a front thread portion being successive to the chamfered thread portion, and a remaining rear thread portion, the front thread portion having a length in an axial direction of the thread forming tap five times or less a pitch P of the external thread;
the front thread portion being formed of:
   one of a major diameter and a pitch diameter of the external thread having (1) a fixed radial size, equal to that of a proximal end of the chamfered thread portion with a gradient of change along the axial direction being zero, or (2) a back taper with a radial size gradually decreasing from the proximal end of the chamfered thread portion toward the rear thread portion with a predetermined gradient of change, and the other of the major diameter and the pitch diameter being formed with a back taper with a radial size gradually decreasing from the proximal end of the chamfered thread portion toward the rear thread portion with a predetermined gradient of change;

the rear thread portion having each of the major diameter and the pitch diameter being formed with a back taper with a radial size gradually decreasing from a proximal end of the front thread portion toward a shank respectively; and the gradient of change at the rear thread portion being greater than the gradient of change at the front thread portion for the one of the major diameter and the pitch diameter of the external thread, and the gradient of change at the rear thread portion being similar as the gradient of change in the front thread portion for the other of the major diameter and the pitch diameter of the external thread.

2. The thread forming tap according to claim 1, wherein:
in the front thread portion, the one of the major diameter and the pitch diameter of the external thread having the gradient of change being zero or being formed with the back taper with the radial size gradually decreasing with a fixed gradient of change of 3 μm or less for the pitch P (pitch) of the external thread; and in the rear thread portion, each of the major diameter and the pitch diameter being formed with the back taper with the radial size gradually decreasing with a fixed gradient of change ranging from 3 to 7 μm for the pitch P (pitch) of the external thread.

3. The thread forming tap according to claim 1, wherein:
the back taper in the front thread portion has a smaller gradient of change with which the radial size of the one of the major diameter and the pitch diameter gradually decreases than that in the rear thread portion.

4. The thread forming tap according to claim 2, wherein:
the back taper in the front thread portion has a smaller gradient of change with which the radial size of the one of the major diameter and the pitch diameter gradually decreases than that in the rear thread portion.

* * * * *